(12) United States Patent
Shows et al.

(10) Patent No.: US 12,429,935 B2
(45) Date of Patent: Sep. 30, 2025

(54) MANAGING THERMAL EXCURSIONS AT AN INFORMATION HANDLING SYSTEM

(71) Applicant: Dell Products L.P., Round Rock, TX (US)

(72) Inventors: Thomas Alexander Shows, Leander, TX (US); Suraj M Varma, Portland, OR (US)

(73) Assignee: Dell Products L.P., Round Rock, TX (US)

( * ) Notice: Subject to any disclaimer, the term of this patent is extended or adjusted under 35 U.S.C. 154(b) by 217 days.

(21) Appl. No.: 18/351,602

(22) Filed: Jul. 13, 2023

(65) Prior Publication Data

US 2025/0021147 A1    Jan. 16, 2025

(51) Int. Cl.
   *G06F 1/26* (2006.01)
(52) U.S. Cl.
   CPC ...................... *G06F 1/26* (2013.01)
(58) Field of Classification Search
   CPC .......................................................... G06F 1/26
   USPC ......................................................... 713/340
   See application file for complete search history.

(56) References Cited

U.S. PATENT DOCUMENTS

| | | | | |
|---|---|---|---|---|
| 9,910,470 | B2* | 3/2018 | Garg | G06F 1/3243 |
| 10,862,329 | B2* | 12/2020 | Venkatraman | H02J 50/10 |
| 11,237,840 | B2* | 2/2022 | Adiletta | G06F 1/1632 |
| 11,720,164 | B1* | 8/2023 | Fredette | G06F 1/3243 |
| | | | | 713/324 |
| 2012/0198207 | A1* | 8/2012 | George | G06F 9/5094 |
| | | | | 712/E9.001 |
| 2017/0031431 | A1* | 2/2017 | Khatri | G06F 1/3246 |
| 2018/0275742 | A1* | 9/2018 | Seol | G06F 1/3293 |
| 2018/0349176 | A1* | 12/2018 | Andrus | G06F 9/5094 |

* cited by examiner

*Primary Examiner* — Brian T Misiura
(74) *Attorney, Agent, or Firm* — McDermott Will & Schulte LLP (57) ABSTRACT

Managing thermal excursions at an information handling system, including identifying a default processing unit configuration of a processor, the processor including a plurality of processing units, the plurality of processing units include efficiency processing units and performance processing units; identifying a minimum frequency for each processing unit of the plurality of processing units; identifying a steady state power limit associated with the processor; identifying a current power of the processor; comparing the current power of the processor with the steady state power limit; determining, based on comparing the current power of the processor with the steady state power limit, that the current power of the processor is less than the steady state power limit; and enabling, in response to determining that the current power of the processor is less than the steady state power limit, one of the efficiency processing units.

17 Claims, 3 Drawing Sheets

MANAGING THERMAL EXCURSIONS AT AN INFORMATION HANDLING SYSTEM

BACKGROUND

Field of the Disclosure

The disclosure relates generally to an information handling system, and in particular, managing thermal excursions at an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiency the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method of managing thermal excursions at an information handling system, including identifying a default processing unit configuration of a processor, the processor including a plurality of processing units, the plurality of processing units include efficiency processing units and performance processing units; identifying a minimum frequency for each processing unit of the plurality of processing units; identifying a steady state power limit associated with the processor; identifying a current power of the processor; comparing the current power of the processor with the steady state power limit; determining, based on comparing the current power of the processor with the steady state power limit, that the current power of the processor is less than the steady state power limit; and enabling, in response to determining that the current power of the processor is less than the steady state power limit, one of the efficiency processing units.

Other embodiments of these aspects include corresponding systems, apparatus, and computer programs, configured to perform the actions of the methods, encoded on computer storage devices.

These and other embodiments may each optionally include one or more of the following features. For instance, determining, based on comparing the current power of the processor with the steady state power limit, that the current power of the processor is greater than the steady state power limit; identifying an average, over a period of time, power of the processor; comparing the average power of the processor with a modified steady state power limit; determining, based on comparing the average power of the processor with the modified steady state power limit, that the average power of the processor is less than the modified steady state power limit; and enabling, in response to determining that the average power of the processor is less than the modified steady state power limit, one of the performance processing units. Determining, based on comparing the average power of the processor with the modified steady state power limit, that the average power of the processor is greater than the modified steady state power limit; identifying, in response to determining that the average power of the processor is greater than the modified steady state power limit, a current frequency for each processing unit of the plurality of processing units; comparing the current frequency for each processing unit with a modified minimum frequency for each processing unit; determining, based on comparing the current frequency for each processing unit with the modified minimum frequency for each processing unit, that the current frequency for each processing unit is less than the modified minimum frequency for each processing unit; identifying, in response to determining that the current frequency for each processing unit is less than the modified minimum frequency for each processing unit, a current processing unit configuration of the processor; determining that there is more than one efficiency processing unit is enabled; disabling, in response to determining that there is more than one efficiency processing unit is enabled, one of the efficiency processing units. Determining, based on comparing the average power of the processor with the modified steady state power limit, that the average power of the processor is greater than the modified steady state power limit; identifying, in response to determining that the average power of the processor is greater than the modified steady state power limit, a current frequency for each processing unit of the plurality of processing units; comparing the current frequency for each processing unit with a modified minimum frequency for each processing unit; determining, based on comparing the current frequency for each processing unit with the modified minimum frequency for each processing unit, that the current frequency for each processing unit is less than the modified minimum frequency for each processing unit; identifying, in response to determining that the current frequency for each processing unit is less than the modified minimum frequency for each processing unit, a current processing unit configuration of the processor; determining that there are zero efficiency processing units enabled; determining, in response to determining that there are zero efficiency processing units enabled, determining that there are two or more performance processing units enabled; disabling, in response to determining that there are zero efficiency processing units enabled, one of the performance processing units. Determining, based on comparing the average power of the processor with the modified steady state power limit, that the average power of the processor is greater than the modified steady state power limit; identifying, in response to determining that the average power of the processor is greater than the modified steady state power limit, a current frequency for each processing unit of the plurality of processing units; comparing the current frequency for each processing unit with a modified minimum frequency for each processing unit; determining, based on comparing the current frequency for each processing unit with the modified minimum frequency for each processing unit, that the current frequency for each processing unit is less than the modified minimum frequency for each processing unit; identifying, in response to determining that the current frequency for each processing unit is less than the modified minimum frequency for each processing unit, a current processing unit configuration of the processor; determining that there are zero efficiency processing units enabled; determining, in response to determining that there are zero efficiency processing units enabled, determining that there is one performance processing unit enabled; and identifying an updated steady state power limit associated with the processor. After enabling one of the efficiency processing units, waiting a first period of time; and after waiting the first period of time, identifying an updated steady state power limit associated with the processor. After enabling one of the performance processing units, waiting a second period of time; and after waiting the second period of time, identifying an updated steady state power limit associated with the processor. Determining, based on comparing the average power of the processor with the modified steady state power limit, that the average power of the processor is greater than the modified steady state power limit; identifying, in response to determining that the average power of the processor is greater than the modified steady state power limit, a current frequency for each processing unit of the plurality of processing units; comparing the current frequency for each processing unit with a modified minimum frequency for each processing unit; determining, based on comparing the current frequency for each processing unit with the modified minimum frequency for each processing unit, that the current frequency for each processing unit is more than the modified minimum frequency for each processing unit; waiting, in response to determining that the current frequency for each processing unit is more than the modified minimum frequency for each processing unit, a third period of time; and after waiting the third period of time, identifying an updated steady state power limit associated with the processor.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This disclosure discusses methods and systems for managing thermal excursions at an information handling system. In short, a skin temperature of an information handling system (e.g., as a portable computing device) can exceed a pre-determined limit. To reduce the skin temperature of the information handling system, processing units (cores) of a processor of the information handling system can progressively be disabled, starting with efficiency (low-power) processing units and proceeding to performance (high-power) processing units until the skin temperature drops below the limit.

Specifically, this disclosure discusses a system and a method for managing thermal excursions at an information handling system, including identifying a default processing unit configuration of a processor, the processor including a plurality of processing units, the plurality of processing units include efficiency processing units and performance processing units; identifying a minimum frequency for each processing unit of the plurality of processing units; identifying a steady state power limit associated with the processor; identifying a current power of the processor; comparing the current power of the processor with the steady state power limit; determining, based on comparing the current power of the processor with the steady state power limit, that the current power of the processor is less than the steady state power limit; and enabling, in response to determining that the current power of the processor is less than the steady state power limit, one of the efficiency processing units.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 1:
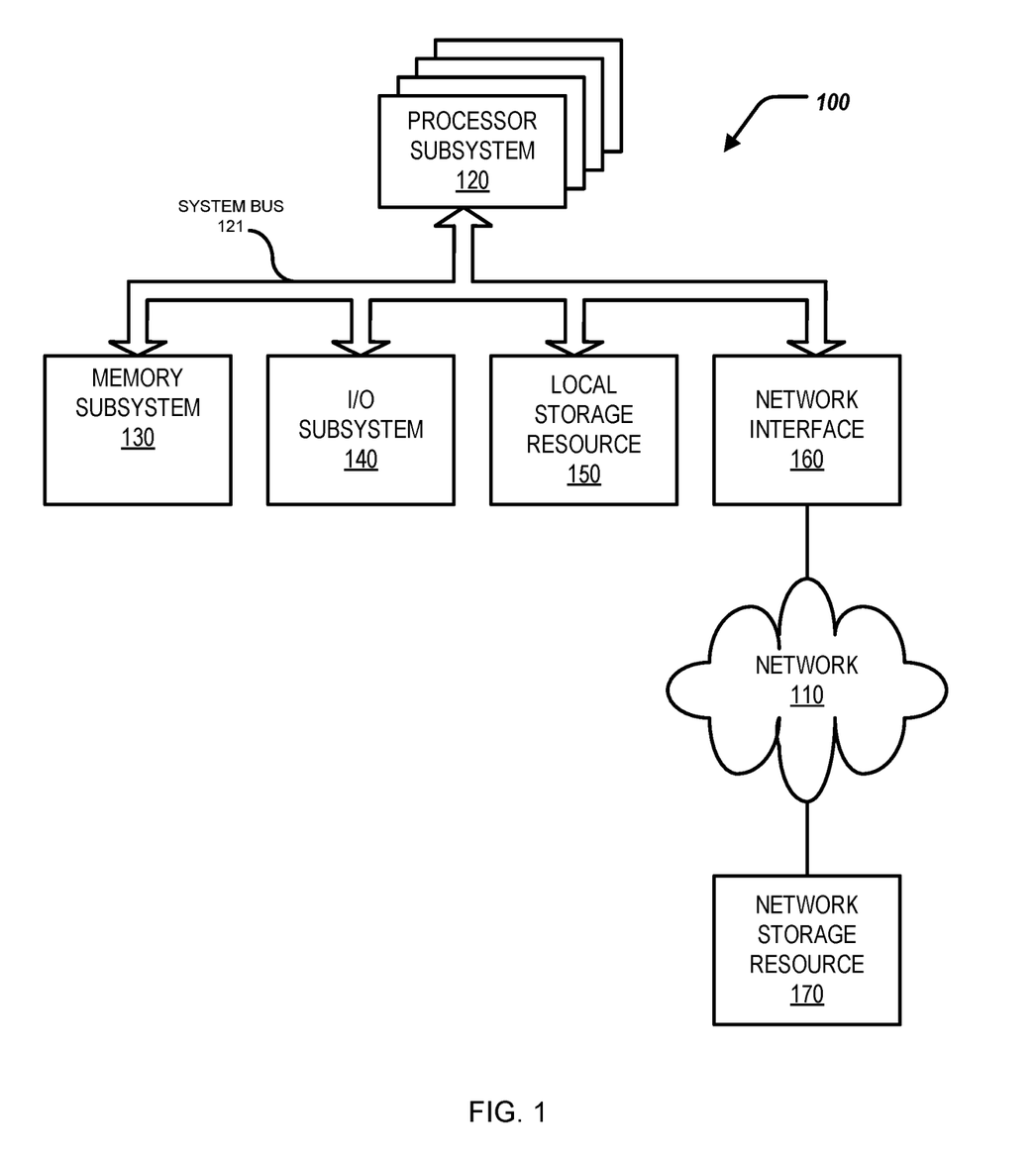
FIG. 1 is a block diagram of selected elements of an embodiment of an information handling system.
Figure 2:
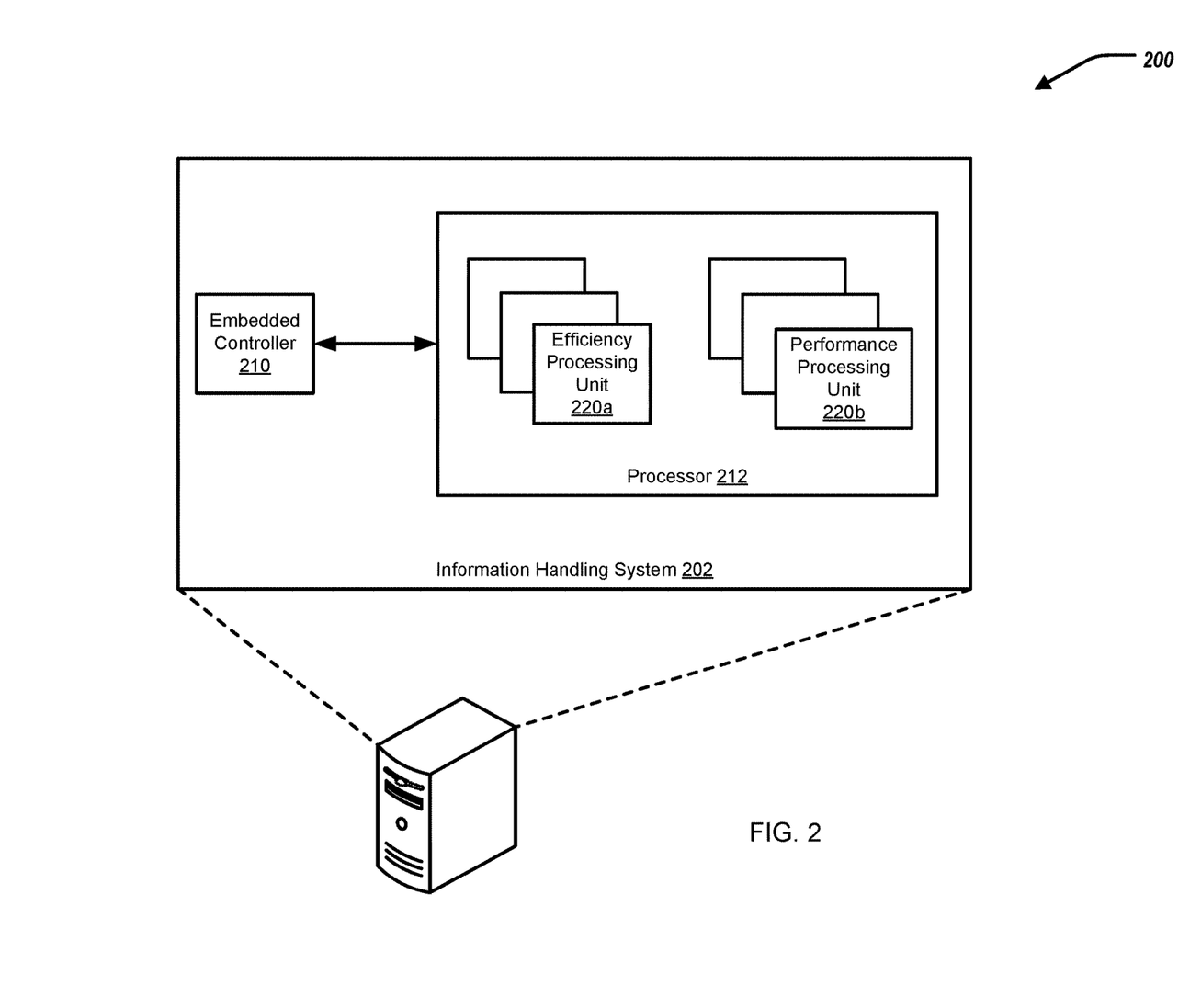
FIG. 2 illustrates a block diagram of an information handling system for managing thermal excursions.
Figure 3:
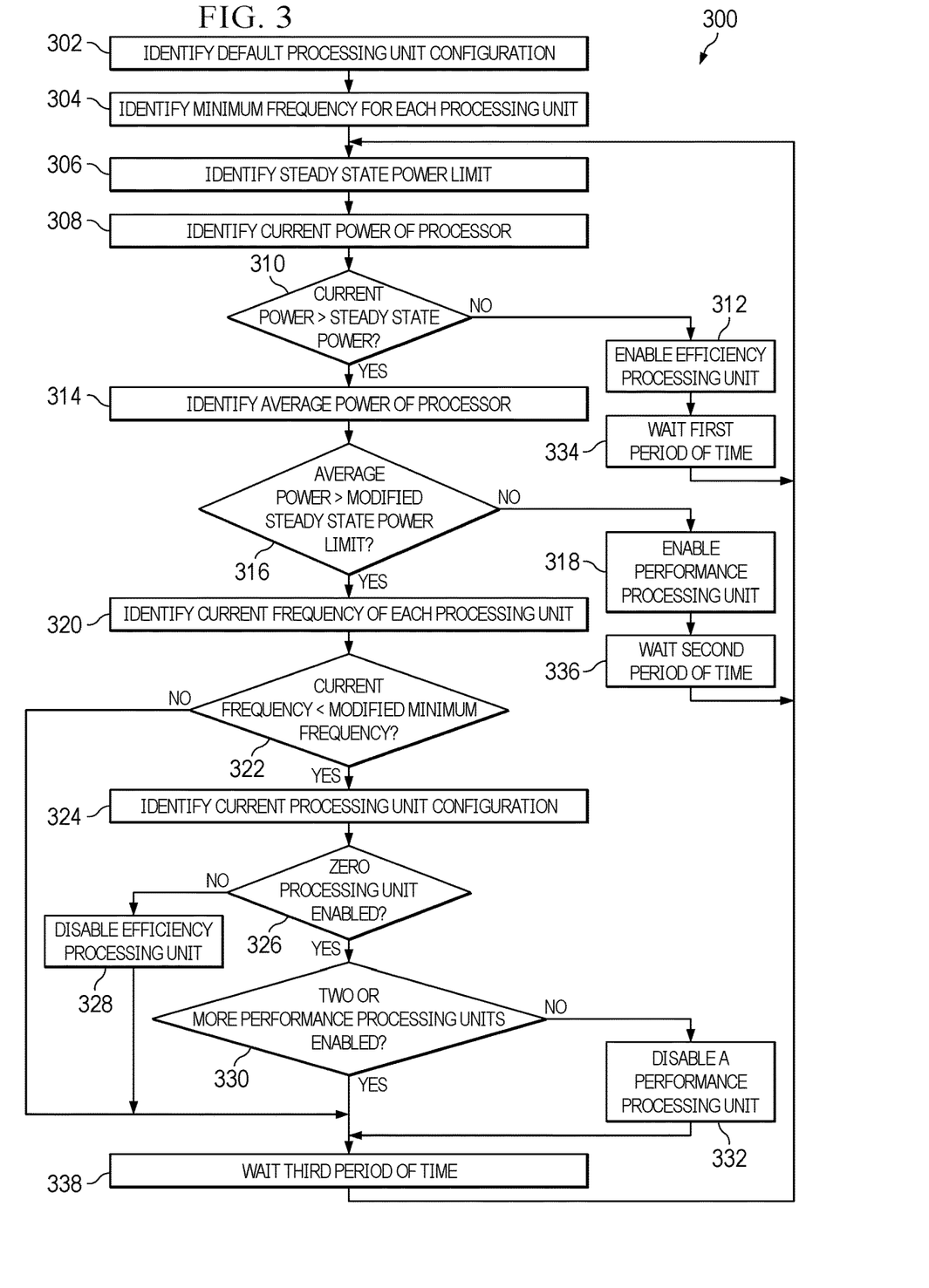
FIG. 3 illustrates a method for managing thermal excursions.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Turning to FIG. 2, FIG. 2 illustrates an environment 200 including an information handling system 202. The information handling system 202 can include an embedded controller (EC) 210 and a processor 212. In some examples, the information handling system 202 is similar to, or includes, the information handling system 100 of FIG. 1. In some examples, the processor 212 is the same, or substantially the same, as the processor subsystem 120 of FIG. 1.

The EC 210 can be in communication with the processor 212.

The processor 212 can include efficiency processing units 220a (or efficiency cores 220a) and performance processing units 220b (or performance cores 222b). The efficiency processing units 220a and the performance processing units 220b can collectively be referred to as processing units 220.

In some examples, the performance processing units 220b can have a greater supported operating frequency as compared to the efficiency processing units 220a. In some examples, the performance processing units 220b can have a greater cache per core as compared to the efficiency processing units 220a. In some examples, the performance processing units 220b can have a greater last-level shared cache across the processing units as compared to the efficiency processing units 220a. In some examples, the performance processing units 220b can have a greater support for wide vector extensions as compared to the efficiency processing units 220a. In some examples, the performance processing units 220b can handle more computationally intensive tasks as compared to the efficiency processing units 220a. In some examples, the efficiency processing units 220a perform "background" computational tasks. In some examples, the performance processing units 220b consume more energy/power as compared to the efficiency processing units 220a.

In short, skin temperature of the information handling system 202 (e.g., as a portable computing device) can exceed a pre-determined limit. To reduce the skin temperature of the information handling system 202, processing units (cores) 220 of the processor 212 of the information handling system 202 can progressively be disabled, starting with efficiency (low-power) processing units 220a and proceeding to performance (high-power) processing units 220b until the skin temperature drops below the limit.

FIG. 3 illustrates a flowchart depicting selected elements of an embodiment of a method 300 for managing thermal excursions at an information handling system. The method 300 may be performed by the information handling system 100, the information handling system 202 and/or the EC 210, and with reference to FIGS. 1-2. It is noted that certain operations described in method 300 may be optional or may be rearranged in different embodiments.

The EC 210 identifies a default processing unit configuration of the processor 212, at 302. In some examples, the default processing unit configuration can include a number of processing units (or cores) that are enabled by default and available for use (e.g., by an OS thread scheduler to schedule work-process execution). The default processing unit configuration is that which the processor 212 presents at boot of the information handling system 202, and in some examples, that is presented to the operations system (OS) of the information handling system 202 when the BIOS installation completes and hands off to the OS. In some examples, the default processing unit configuration of the processor 212 includes a subset of the processing units 220 being enabled.

The EC 120 identifies a minimum frequency for each processing unit 220, at 304. In some examples, the minimum frequency for each processing unit 220 can be referred to as "Low Frequency Mode" or LFM. In some examples, the minimum frequency for each processing unit 220 can be the minimum frequency with which the clocks would operate in view of all other synchronization that occurs with memory (e.g., memory subsystem 130) and I/O ports (e.g., I/O subsystem 140).

The EC 210 identifies a steady state power limit associated with the processor 212, at 306. In some examples, the steady state power limit is the effective long-term expected steady state power consumption of the processor 212 (e.g., "PL1").

The EC 210 identifies a current power of the processor 212, at 308. In some examples, each of the processing units 220 of the processor 212 can be associated with a power input and a power domain. The current power of the processor 212 can be the summation of the power of each of the processing units 220 ("package power") that is currently enabled.

The EC 210 compares the current power of the processor 212 with the steady state power limit, at 310. In some examples, the EC 210 determines, based on comparing the current power of the processor 212 with the steady state power limit, that the current power of the processor 212 is less than the steady state power limit (at 310). Thus, the steady state power limit is applied to the processor 212 as a whole, and not specific processing units 220 of the processor 212. The EC 210, in response to determining that the current power of the processor 212 is less than the steady state power limit, enables one of the efficiency processing units 220a, at 312. That is, the EC 210 enables one of the efficiency processing units 220a that was previously not enabled. In some examples, enabling the efficiency processing unit 220a can include facilitating workload processing at the efficiency processing unit 220a.

In some examples, the EC 210 determines, based on comparing the current power of the processor 212 with the steady state power limit, that the current power of the processor 212 is greater than the steady state power limit (at 310). The EC 210, in response to determining that the current power of the processor 212 is greater than the steady state power limit, identifies an average, over a period of time, power of the processor 212, at 314. In some examples, the average power of the processor 212 ("average package power") is an arithmetic mean of the power over a period of time. In some examples, the average power of the processor 212 is a weighted average, such as an exponentially weighted mean average (EWMA).

The EC 210 compares the average power of the processor 212 with a modified steady state power limit, at 316. In some examples, the modified steady state power limit is the steady state power limit minus a margin offset. In some examples, the margin offset facilitates providing programmable hysteresis to avoid oscillations when then average package power is equal to the steady state power limit. For example, if the steady state power limit is 12 Watts, the margin offset can be 1 Watt (to minimize triggering core configuration changes too often).

In some examples, the EC 210 determines, based on comparing the average power of the processor 212 with the modified steady state power limit, that the average power of the processor 212 is less than the modified steady state power limit (at 316). The EC 210, in response to determining that the average power of the processor 212 is less than the modified steady state power limit, enables one of the performance processing units 220b, at 318. That is, the EC 210 enables one of the performance processing units 220b that was previously not enabled. In some examples, enabling the performance processing unit 220*b* can include facilitating workload processing at the performance processing unit 220*b*.

In some examples, the EC 210 determines, based on comparing the average power of the processor 212 with the modified steady state power limit, that the average power of the processor 212 is greater than the modified steady state power limit (at 316). The EC 210, in response to determining that the average power of the processor 212 is greater than the modified steady state power limit, identifies a current (operating) frequency for each processing unit 220, at 320. The EC 210 compares the current frequency for each processing unit 220 with a modified minimum frequency for each processing unit 220, at 322. In some examples, the modified minimum frequency is the minimum frequency plus a margin offset. In some examples, the margin offset facilitates increasing how often processing units 220 are disabled. For example, the minimum frequency per processing unit 220 can be 400 MHZ, and there frequency margin offset can be 200 MHz, resulting in the modified minimum frequency of 600 Mhz.

In some examples, the EC 210 determines, based on comparing the current frequency for each processing unit 220 with the minimum frequency for each processing unit 220 (at 322), that the current frequency for each processing unit 220 is less than the minimum frequency for each processing unit 220. The EC 210, in response to determining that the current frequency for each processing unit 220 is less than the minimum frequency for each processing unit 220, identifies a current processing unit (core) configuration of the processor 212, at 324. The current processing unit configuration is the number of processing units 220 that are currently available. The number of processing units 220 currently available can be less than the number of processing units 220 available in the default configuration of the processor 212.

The EC 210 determines the number of efficiency processing units 220*a* that are enabled, at 326. In some examples, the EC 210 determines that there is more than one efficiency processing unit 220*a* enabled. The EC 210, in response to determining that there is more than one efficiency processing unit 220*a* (currently) enabled (at 326), disables one of the efficiency processing units 220*a*, at 328. In some examples, the EC 210 determines that there are (currently) zero efficiency processing units enabled. The EC 210, in response to determining that there are zero efficiency processing units enabled, determines the number of performance processing units 220*b* that are (currently) enabled, at 330. In some examples, the EC 210 determines that there are two or more performance processing units 220*b* enabled. The EC 210, in response to determining that there are two or more performance processing units 220*b* enabled (at 330), disables one of the performance processing units 220*b*, at 332. In some examples, the EC 210 determines that there are less than two performance processing units 220*b* enabled (only one performance processing unit 220*b* enabled). The EC 210, in response to determining that there are less than two performance processing units 220*b* enabled (at 330), identifies an updated steady state power limit associated with the processor 212, at 306.

In some examples, after enabling one of the efficiency processing units 220*a* (at 312), the EC 210 waits a first period of time (sleep state), at 334. After waiting the first period of time, the EC 210 identifies an updated steady state power limit associated with the processor 212, at 306.

In some examples, after enabling one of the performance processing units 220*b* (at 318), the EC 210 waits a second period of time (sleep state), at 336. After waiting the second period of time, the EC 210 identifies an updated steady state power limit associated with the processor 212, at 306. In some examples, the second period of time is greater than the first period of time.

In some examples, the EC 210 determines, based on comparing the current frequency for each processing unit 220 with the minimum frequency for each processing unit 220 (at 322), that the current frequency for each processing unit 220 is more than the minimum frequency for each processing unit 220. The EC 210, in response to determining that the current frequency for each processing unit 220 is more than the minimum frequency for each processing unit 220, waits a third period of time (sleep state), at 338. After waiting the third period of time, the EC 210 identifies an updated steady state power limit associated with the processor 212, at 306.

In some examples, after disabling one of the efficiency processing units 220*a* (at 328), the EC 210 waits the third period of time (sleep state), at 338. After waiting the third period of time, the EC 210 identifies an updated steady state power limit associated with the processor 212, at 306.

In some examples, after disabling one of the performance processing units 220*b* (at 332), the EC 210 waits the third period of time (sleep state), at 338. After waiting the third period of time, the EC 210 identifies an updated steady state power limit associated with the processor 212, at 306.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of managing thermal excursions at an information handling system, comprising:
    identifying a default processing unit configuration of a processor, the processor including a plurality of processing units, the plurality of processing units include efficiency processing units and performance processing units;
    identifying a minimum frequency for each processing unit of the plurality of processing units;
    identifying a steady state power limit associated with the processor;
    identifying a current power of the processor;
    comparing the current power of the processor with the steady state power limit;
    determining, based on comparing the current power of the processor with the steady state power limit, that the current power of the processor is less than the steady state power limit;
    enabling, in response to determining that the current power of the processor is less than the steady state power limit, one of the efficiency processing units;
    determining, based on comparing the current power of the processor with the steady state power limit, that the current power of the processor is greater than the steady state power limit;
    identifying an average, over a period of time, power of the processor;
    comparing the average power of the processor with a modified steady state power limit;
    determining, based on comparing the average power of the processor with the modified steady state power limit, that the average power of the processor is less than the modified steady state power limit; and
    enabling, in response to determining that the average power of the processor is less than the modified steady state power limit, one of the performance processing units.

2. The computer-implemented method of claim 1, further comprising:
    determining, based on comparing the average power of the processor with the modified steady state power limit, that the average power of the processor is greater than the modified steady state power limit;
    identifying, in response to determining that the average power of the processor is greater than the modified steady state power limit, a current frequency for each processing unit of the plurality of processing units;
    comparing the current frequency for each processing unit with a modified minimum frequency for each processing unit;
    determining, based on comparing the current frequency for each processing unit with the modified minimum frequency for each processing unit, that the current frequency for each processing unit is less than the modified minimum frequency for each processing unit;
    identifying, in response to determining that the current frequency for each processing unit is less than the modified minimum frequency for each processing unit, a current processing unit configuration of the processor;
    determining that there is more than one efficiency processing unit is enabled;
    disabling, in response to determining that there is more than one efficiency processing unit is enabled, one of the efficiency processing units.

3. The computer-implemented method of claim 1, further comprising:
    determining, based on comparing the average power of the processor with the modified steady state power limit, that the average power of the processor is greater than the modified steady state power limit;
    identifying, in response to determining that the average power of the processor is greater than the modified steady state power limit, a current frequency for each processing unit of the plurality of processing units;
    comparing the current frequency for each processing unit with a modified minimum frequency for each processing unit;
    determining, based on comparing the current frequency for each processing unit with the modified minimum frequency for each processing unit, that the current frequency for each processing unit is less than the modified minimum frequency for each processing unit;
    identifying, in response to determining that the current frequency for each processing unit is less than the modified minimum frequency for each processing unit, a current processing unit configuration of the processor;
    determining that there are zero efficiency processing units enabled;
    determining, in response to determining that there are zero efficiency processing units enabled, determining that there are two or more performance processing units enabled;
    disabling, in response to determining that there are zero efficiency processing units enabled, one of the performance processing units.

4. The computer-implemented method of claim 1, further comprising:
    determining, based on comparing the average power of the processor with the modified steady state power limit, that the average power of the processor is greater than the modified steady state power limit;
    identifying, in response to determining that the average power of the processor is greater than the modified steady state power limit, a current frequency for each processing unit of the plurality of processing units;
    comparing the current frequency for each processing unit with a modified minimum frequency for each processing unit;
    determining, based on comparing the current frequency for each processing unit with the modified minimum frequency for each processing unit, that the current frequency for each processing unit is less than the modified minimum frequency for each processing unit;
    identifying, in response to determining that the current frequency for each processing unit is less than the modified minimum frequency for each processing unit, a current processing unit configuration of the processor;
    determining that there are zero efficiency processing units enabled;
    determining, in response to determining that there are zero efficiency processing units enabled, determining that there is one performance processing unit enabled; and
    identifying an updated steady state power limit associated with the processor.

5. The computer-implemented method of claim 1, further comprising:
    after enabling one of the efficiency processing units, waiting a first period of time; and
    after waiting the first period of time, identifying an updated steady state power limit associated with the processor.

6. The computer-implemented method of claim 1, further comprising:
   after enabling one of the performance processing units, waiting a second period of time; and
   after waiting the second period of time, identifying an updated steady state power limit associated with the processor.

7. The computer-implemented method of claim 1, further comprising:
   determining, based on comparing the average power of the processor with the modified steady state power limit, that the average power of the processor is greater than the modified steady state power limit;
   identifying, in response to determining that the average power of the processor is greater than the modified steady state power limit, a current frequency for each processing unit of the plurality of processing units;
   comparing the current frequency for each processing unit with a modified minimum frequency for each processing unit;
   determining, based on comparing the current frequency for each processing unit with the modified minimum frequency for each processing unit, that the current frequency for each processing unit is more than the modified minimum frequency for each processing unit;
   waiting, in response to determining that the current frequency for each processing unit is more than the modified minimum frequency for each processing unit, a third period of time; and
   after waiting the third period of time, identifying an updated steady state power limit associated with the processor.

8. An information handling system comprising a processor having access to memory media storing instructions executable by the processor to perform operations, comprising:
   identifying a default processing unit configuration of a processor, the processor including a plurality of processing units, the plurality of processing units include efficiency processing units and performance processing units;
   identifying a minimum frequency for each processing unit of the plurality of processing units;
   identifying a steady state power limit associated with the processor;
   identifying a current power of the processor;
   comparing the current power of the processor with the steady state power limit;
   determining, based on comparing the current power of the processor with the steady state power limit, that the current power of the processor is less than the steady state power limit;
   enabling, in response to determining that the current power of the processor is less than the steady state power limit, one of the efficiency processing units;
   determining, based on comparing the current power of the processor with the steady state power limit, that the current power of the processor is greater than the steady state power limit;
   identifying an average, over a period of time, power of the processor;
   comparing the average power of the processor with a modified steady state power limit;
   determining, based on comparing the average power of the processor with the modified steady state power limit, that the average power of the processor is less than the modified steady state power limit; and
   enabling, in response to determining that the average power of the processor is less than the modified steady state power limit, one of the performance processing units.

9. The information handling system of claim 8, the operations further comprising:
   determining, based on comparing the average power of the processor with the modified steady state power limit, that the average power of the processor is greater than the modified steady state power limit;
   identifying, in response to determining that the average power of the processor is greater than the modified steady state power limit, a current frequency for each processing unit of the plurality of processing units;
   comparing the current frequency for each processing unit with a modified minimum frequency for each processing unit;
   determining, based on comparing the current frequency for each processing unit with the modified minimum frequency for each processing unit, that the current frequency for each processing unit is less than the modified minimum frequency for each processing unit;
   identifying, in response to determining that the current frequency for each processing unit is less than the modified minimum frequency for each processing unit, a current processing unit configuration of the processor;
   determining that there is more than one efficiency processing unit is enabled;
   disabling, in response to determining that there is more than one efficiency processing unit is enabled, one of the efficiency processing units.

10. The information handling system of claim 8, the operations further comprising:
    determining, based on comparing the average power of the processor with the modified steady state power limit, that the average power of the processor is greater than the modified steady state power limit;
    identifying, in response to determining that the average power of the processor is greater than the modified steady state power limit, a current frequency for each processing unit of the plurality of processing units;
    comparing the current frequency for each processing unit with a modified minimum frequency for each processing unit;
    determining, based on comparing the current frequency for each processing unit with the modified minimum frequency for each processing unit, that the current frequency for each processing unit is less than the modified minimum frequency for each processing unit;
    identifying, in response to determining that the current frequency for each processing unit is less than the modified minimum frequency for each processing unit, a current processing unit configuration of the processor;
    determining that there are zero efficiency processing units enabled;
    determining, in response to determining that there are zero efficiency processing units enabled, determining that there are two or more performance processing units enabled;
    disabling, in response to determining that there are zero efficiency processing units enabled, one of the performance processing units.

11. The information handling system of claim 8, the operations further comprising:
    determining, based on comparing the average power of the processor with the modified steady state power limit, that the average power of the processor is greater than the modified steady state power limit;
identifying, in response to determining that the average power of the processor is greater than the modified steady state power limit, a current frequency for each processing unit of the plurality of processing units;
comparing the current frequency for each processing unit with a modified minimum frequency for each processing unit;
determining, based on comparing the current frequency for each processing unit with the modified minimum frequency for each processing unit, that the current frequency for each processing unit is less than the modified minimum frequency for each processing unit;
identifying, in response to determining that the current frequency for each processing unit is less than the modified minimum frequency for each processing unit, a current processing unit configuration of the processor;
determining that there are zero efficiency processing units enabled;
determining, in response to determining that there are zero efficiency processing units enabled, determining that there is one performance processing unit enabled; and
identifying an updated steady state power limit associated with the processor.

12. The information handling system of claim 8, the operations further comprising:
after enabling one of the efficiency processing units, waiting a first period of time; and
after waiting the first period of time, identifying an updated steady state power limit associated with the processor.

13. The information handling system of claim 8, the operations further comprising:
after enabling one of the performance processing units, waiting a second period of time; and
after waiting the second period of time, identifying an updated steady state power limit associated with the processor.

14. The information handling system of claim 8, the operations further comprising:
determining, based on comparing the average power of the processor with the modified steady state power limit, that the average power of the processor is greater than the modified steady state power limit;
identifying, in response to determining that the average power of the processor is greater than the modified steady state power limit, a current frequency for each processing unit of the plurality of processing units;
comparing the current frequency for each processing unit with a modified minimum frequency for each processing unit;
determining, based on comparing the current frequency for each processing unit with the modified minimum frequency for each processing unit, that the current frequency for each processing unit is more than the modified minimum frequency for each processing unit;
waiting, in response to determining that the current frequency for each processing unit is more than the modified minimum frequency for each processing unit, a third period of time; and
after waiting the third period of time, identifying an updated steady state power limit associated with the processor.

15. A non-transitory computer-readable medium storing software comprising instructions executable by one or more computers which, upon such execution, cause the one or more computers to perform operations comprising:
identifying a default processing unit configuration of a processor, the processor including a plurality of processing units, the plurality of processing units include efficiency processing units and performance processing units;
identifying a minimum frequency for each processing unit of the plurality of processing units;
identifying a steady state power limit associated with the processor;
identifying a current power of the processor;
comparing the current power of the processor with the steady state power limit;
determining, based on comparing the current power of the processor with the steady state power limit, that the current power of the processor is less than the steady state power limit;
enabling, in response to determining that the current power of the processor is less than the steady state power limit, one of the efficiency processing units;
determining, based on comparing the current power of the processor with the steady state power limit, that the current power of the processor is greater than the steady state power limit;
identifying an average, over a period of time, power of the processor;
comparing the average power of the processor with a modified steady state power limit;
determining, based on comparing the average power of the processor with the modified steady state power limit, that the average power of the processor is less than the modified steady state power limit; and
enabling, in response to determining that the average power of the processor is less than the modified steady state power limit, one of the performance processing units.

16. The non-transitory computer-readable medium of claim 15, the operations further comprising:
determining, based on comparing the average power of the processor with the modified steady state power limit, that the average power of the processor is greater than the modified steady state power limit;
identifying, in response to determining that the average power of the processor is greater than the modified steady state power limit, a current frequency for each processing unit of the plurality of processing units;
comparing the current frequency for each processing unit with a modified minimum frequency for each processing unit;
determining, based on comparing the current frequency for each processing unit with the modified minimum frequency for each processing unit, that the current frequency for each processing unit is less than the modified minimum frequency for each processing unit;
identifying, in response to determining that the current frequency for each processing unit is less than the modified minimum frequency for each processing unit, a current processing unit configuration of the processor;
determining that there is more than one efficiency processing unit is enabled;
disabling, in response to determining that there is more than one efficiency processing unit is enabled, one of the efficiency processing units.

17. The non-transitory computer-readable medium of claim 15, the operations further comprising:

determining, based on comparing the average power of the processor with the modified steady state power limit, that the average power of the processor is greater than the modified steady state power limit;

identifying, in response to determining that the average power of the processor is greater than the modified steady state power limit, a current frequency for each processing unit of the plurality of processing units;

comparing the current frequency for each processing unit with a modified minimum frequency for each processing unit;

determining, based on comparing the current frequency for each processing unit with the modified minimum frequency for each processing unit, that the current frequency for each processing unit is less than the modified minimum frequency for each processing unit;

identifying, in response to determining that the current frequency for each processing unit is less than the modified minimum frequency for each processing unit, a current processing unit configuration of the processor;

determining that there are zero efficiency processing units enabled;

determining, in response to determining that there are zero efficiency processing units enabled, determining that there are two or more performance processing units enabled;

disabling, in response to determining that there are zero efficiency processing units enabled, one of the performance processing units.

* * * * *